(12) United States Patent
Yamamura

(10) Patent No.: US 11,418,135 B2
(45) Date of Patent: Aug. 16, 2022

(54) CONTROL APPARATUS AND CONTROL METHOD

(71) Applicant: Eisuke Yamamura, Kanagawa (JP)

(72) Inventor: Eisuke Yamamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 131 days.

(21) Appl. No.: 16/941,899

(22) Filed: Jul. 29, 2020

(65) Prior Publication Data

US 2021/0036635 A1 Feb. 4, 2021

(30) Foreign Application Priority Data

Jul. 31, 2019 (JP) .............................. JP2019-141789
May 29, 2020 (JP) .............................. JP2020-094814

(51) Int. Cl.
| | | |
|---|---|---|
| *H02K 17/34* | (2006.01) | |
| *H02P 5/485* | (2016.01) | |
| *H02K 11/22* | (2016.01) | |
| *B65G 23/00* | (2006.01) | |
| *G03G 15/00* | (2006.01) | |
| *B25J 9/16* | (2006.01) | |
| *B25J 13/08* | (2006.01) | |

(52) U.S. Cl.
CPC ............ *H02P 5/485* (2016.02); *B25J 9/1641* (2013.01); *B65G 23/00* (2013.01); *G03G 15/6529* (2013.01); *H02K 11/22* (2016.01); *B25J 13/088* (2013.01)

(58) Field of Classification Search
CPC ... H02P 4/00; H02P 5/00; H02P 5/485; G05B 19/41805; G05B 19/41865; G05B 19/41885; G03G 15/6529; B65G 23/00
See application file for complete search history.

(56) References Cited

U.S. PATENT DOCUMENTS

| | | | |
|---|---|---|---|
| 7,479,089 B2 | 1/2009 | Yamanaka et al. | |
| 9,228,509 B2 | 1/2016 | Maeda | |
| 11,073,198 B1 * | 7/2021 | Magnus | ................ F16H 37/065 |
| 2019/0288620 A1 | 9/2019 | Koike | |

FOREIGN PATENT DOCUMENTS

| | | |
|---|---|---|
| JP | 2006-250182 | 9/2006 |
| JP | 4030337 | 1/2008 |
| JP | 2009-213190 | 9/2009 |
| JP | 5698777 | 4/2015 |
| JP | 5779766 | 9/2015 |
| JP | 2018-204690 | 12/2018 |
| JP | 2019-162007 | 9/2019 |

\* cited by examiner

*Primary Examiner* — Karen Masih
(74) *Attorney, Agent, or Firm* — IPUSA, PLLC

(57) ABSTRACT

A control apparatus includes a drive instruction value generator configured to generate a first drive instruction value that is greater than or equal to 0, which corresponds to torque in a first rotation direction, for driving a first motor that applies the torque in the first rotation direction to a shaft, and a second drive instruction value that is less than or equal to 0, which corresponds to torque in a second rotation direction, for driving a second motor, which is different from the first motor, that applies the torque in the second rotation direction, which is an opposite direction to the first rotation direction, to the shaft.

9 Claims, 11 Drawing Sheets

CONTROL APPARATUS AND CONTROL METHOD

CROSS-REFERENCE TO RELATED APPLICATION

The present application is based on and claims priority under 35 U.S.C. § 119 to Japanese Patent Application No. 2019-141789, filed on Jul. 31, 2019, and Japanese Patent Application No. 2020-094814, filed on May 29, 2020, the contents of which are incorporated herein by reference in their entirety.

BACKGROUND OF THE INVENTION

1. Field of the Invention

The present invention relates to a control apparatus and a control method.

2. Description of the Related Art

Conventionally, there is known a technique of preventing backlash between two motors and a driven shaft when two motors drive one driven shaft.

Further, there is disclosed a technique of driving the first and second motors on the basis of a torque instruction value for each of the first and second motors and a pre-load torque value generated in response to a change in the acceleration, when the first and second motors drive the driven shaft (see, for example, Patent Document 1).

Patent Document 1: Japanese Patent No. 5698777

SUMMARY OF THE INVENTION

According to one aspect of the present invention, there is provided a control apparatus including a drive instruction value generator configured to generate a first drive instruction value that is greater than or equal to 0, which corresponds to torque in a first rotation direction, for driving a first motor that applies the torque in the first rotation direction to a shaft, and a second drive instruction value that is less than or equal to 0, which corresponds to torque in a second rotation direction, for driving a second motor, which is different from the first motor, that applies the torque in the second rotation direction, which is an opposite direction to the first rotation direction, to the shaft.

DETAILED DESCRIPTION OF THE PREFERRED EMBODIMENTS

Figure 1:
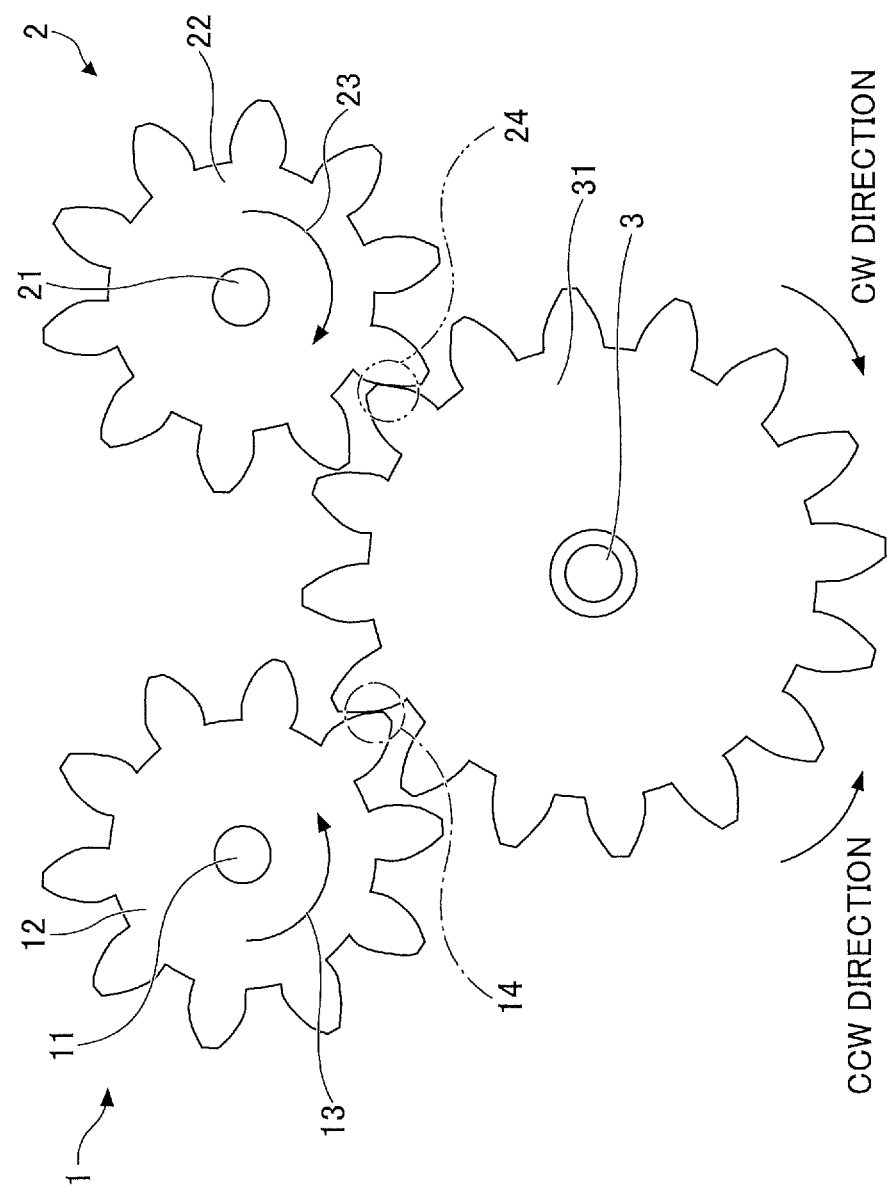
FIG. 1 is a diagram illustrating a configuration example of a first motor and a second motor and a driven shaft according to an embodiment of the present invention.

In the conventional technology, there have been instances where the backlash between the motor and the driven shaft cannot be adequately prevented.

A problem to be addressed by an embodiment of the present invention is to appropriately prevent the backlash between the motor and the driven shaft.

Hereinafter, an embodiment for carrying out the present invention will be described with reference to the drawings. In the drawings, the same elements are denoted by the same reference numerals, and overlapping descriptions may be omitted.

First, a configuration for driving the rotation of one driven shaft 3 using a first motor 1 and a second motor 2 will be described with reference to FIG. 1. FIG. 1 is a diagram illustrating an example of the configuration of the first motor 1, the second motor 2, and the driven shaft 3.

The driven shaft 3 is connected to the rotating shaft of a rotating body, and is a mechanical element that rotates the rotating body by rotating about the axis of the driven shaft 3. Examples of the rotating body include various rollers such as a sheet feed roller, a conveying roller, a secondary conveying roller, and a fixing roller, used in an image forming apparatus.

A gear 31 mounted to the driven shaft 3 engages with each of a gear 12 mounted to a motor shaft 11 of the first motor 1 and a gear 22 mounted to a motor shaft 21 of the second motor 2, and the driven shaft 3 receives torque transmitted from the first motor 1 and the second motor 2 via the gear 31.

In the first motor 1, the gear 12 is rotated in the direction of an arrow 13, and the teeth of the gear 12 and the teeth of the gear 31 come into contact with each other at a portion 14 surrounded by a dashed-dotted line circle to provide torque to the driven shaft 3 in a CW (clockwise) direction.

In the second motor 2, the gear 22 is rotated in the direction of an arrow 23, and the teeth of the gear 22 and the teeth of the gear 31 come into contact with each other at a portion 24 surrounded by a dashed-two dotted line circle to provide torque to the driven shaft 3 in a CCW (counterclockwise) direction.

For the first motor 1 and the second motor 2, a direct current (DC) brushless motor, a stepping motor, and the like may be used. By controlling the torque provided by the first motor 1 and the second motor 2, the rotation direction, the rotation position, and the rotational speed of the driven shaft 3 are controlled.

In the configuration illustrated in FIG. 1, when the driven shaft 3 is rotated in the CW direction, the first motor 1 provides torque in the CW direction to the driven shaft 3, and the second motor 2 provides torque in the CCW direction to the driven shaft 3. The torque in the CCW direction pushes the teeth of the gear 31 more strongly against the gear 12. This maintains the contact state between the gear 12 and the gear 31 at the portion 14 and prevents a gap (backlash) from being generated between the gears.

When the driven shaft 3 is rotated in the CCW direction, the second motor 2 provides torque in the CCW direction to the driven shaft, and the first motor 1 provides torque in the CW direction to the driven shaft. The torque in the CW direction pushes the teeth of the gear 31 more strongly against the gear 22. This maintains the contact state between the gear 22 and the gear 31 at the portion 24 and prevents backlash.

In this manner, the first motor 1 and the second motor 2 can be used to prevent backlash and cause the driven shaft 3 to rotate, and the rotation position control and the like of the driven shaft 3 can be performed with high accuracy. Here, the CW direction corresponds to the "first rotation direction" and the CCW direction corresponds to the "second rotation direction".

On the other hand, in the configuration illustrated in FIG. 1, when the inertia of the driven shaft 3 is larger than the inertia of the first motor 1 and the second motor 2, the rotation of the gear 31 is delayed in terms of time with respect to the first motor 1 or the second motor 2 due to the inertia of the driven shaft 3, and the teeth of the gear 12 and the teeth of the gear 31 may be separated (spaced apart) from each other or the teeth of the gear 22 and the teeth of the gear 31 may be separated (spaced apart) from each other.

For example, if the driven shaft 3 is rotated in the CW direction from the state where the driven shaft 3 is stationary, the rotation of the gear 31 is delayed relative to the rotation of the second motor 2 due to the inertia of the driven shaft 3, and the teeth of the gear 22 and the teeth of the gear 31 may be separated from each other. Note that when the driven shaft 3 is stationary, the first motor 1 and the second motor 2 provide the same torque to the driven shaft 3 from opposite directions.

Figure 2:
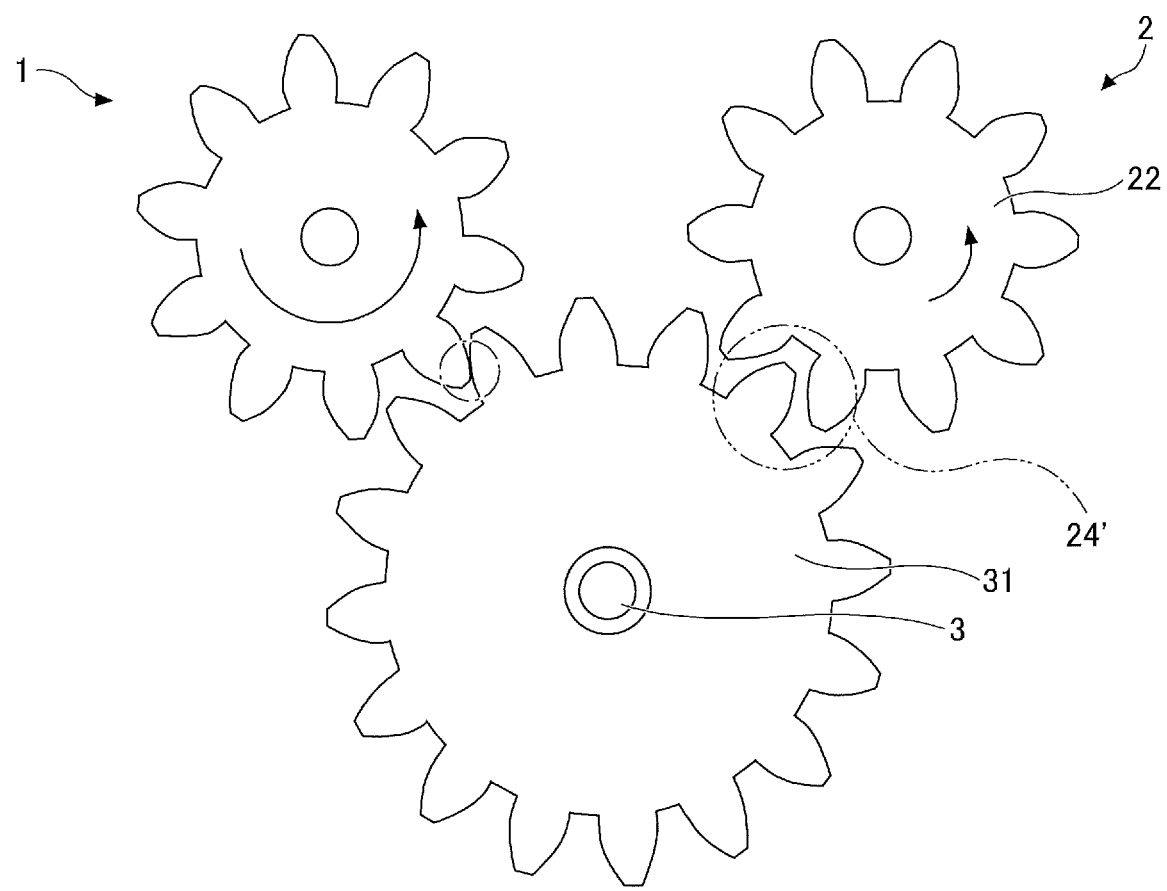
FIG. 2 is a diagram illustrating an example in which the teeth of gears are separated (spaced apart) in the related art.

FIG. 2 is a diagram illustrating an example in which the teeth of the gear 22 and the teeth of the gear 31 are separated (spaced apart) from each other. In FIG. 2, the teeth of the gear 22 and the teeth of the gear 31 are separated at a portion 24' surrounded by a dashed-two dotted line circle. When the teeth are separated in this way, the second motor 2 does not apply torque in the CCW direction to the driven shaft 3, and, therefore, the effect of preventing backlash cannot be obtained.

In the case where the amount of rotation of the driven shaft 3 is large, such a separated state (spaced apart state) may be eliminated due to the acceleration during rotation by the time the rotation ends, and the effect of preventing backlash may be obtained. However, if the amount of rotation of the driven shaft 3 is small, the rotation ends without obtaining the effect of preventing backlash in the separated state, and the rotation position control and the like of the driven shaft 3 cannot be performed with high accuracy.

On the other hand, in the present embodiment, in order to drive the first motor 1 that provides the torque in the CW direction to the driven shaft 3, a first drive instruction value of greater than or equal to 0 is generated, and further, in order to drive the second motor 2 that provides the torque in the CCW direction to the driven shaft 3, a second drive instruction value of less than or equal to 0 is generated. When the first motor 1 is driven by the first drive instruction value and the second motor 2 is driven by the second drive instruction value, the separation between the teeth of the gear 12 and the teeth of the gear 31 or the separation between the teeth of the gear 22 and the teeth of the gear 31 is prevented, and backlash can be prevented.

Hereinafter, an embodiment will be described with respect to a driving system 100 including a control apparatus 110 as an example.

First Embodiment

<Functional Configuration of Control Apparatus 110 According to the First Embodiment>

Figure 3:
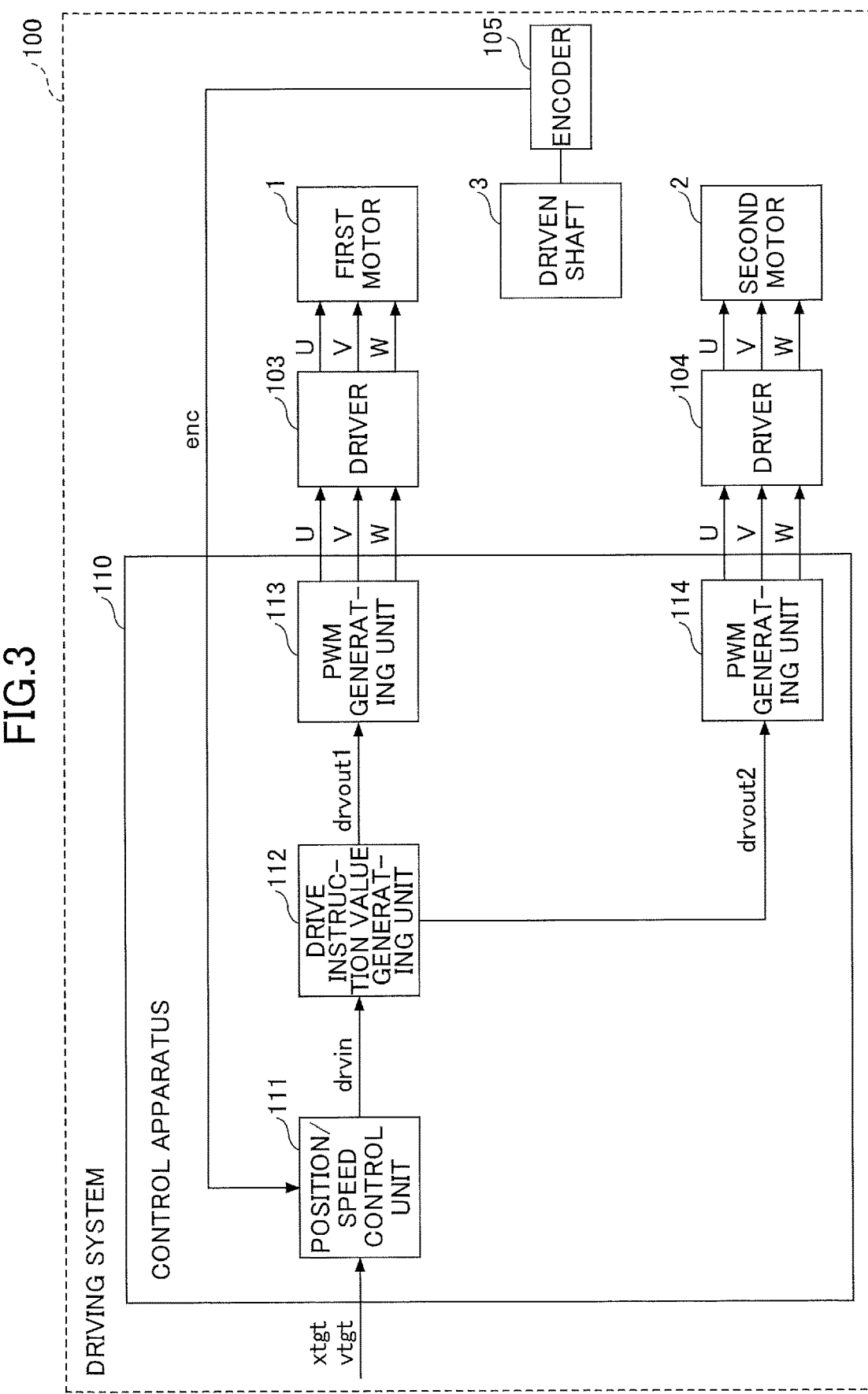
FIG. 3 is a block diagram illustrating an example of a functional configuration of a control apparatus according to a first embodiment of the present invention.

First, a functional configuration of the control apparatus 110 according to the first embodiment will be described. FIG. 3 is a block diagram illustrating an example of a functional configuration of the control apparatus 110. As illustrated in FIG. 3, the control apparatus 110 includes a position/speed control unit 111, a drive instruction value generating unit 112, and pulse width modulation (PWM) generating units 113 and 114.

All of these functions are implemented by electronic circuits. However, the present embodiment is not limited thereto, and some or all of the functions described above may be implemented by a Central Processing Unit (CPU) executing predetermined software. The functions may also be implemented by a plurality of circuits or a combination of software.

The position/speed control unit 111 inputs a position target value xtgt and a speed target value vtgt from an upper controller of the driving system 100. The position/speed control unit 111 inputs an encoding signal enc of the driven shaft 3 from an encoder 105 that detects a rotation angle of the driven shaft 3. Then, a position present value xdet and a speed present value vdet of the driven shaft 3 are acquired based on the encoding signal enc.

The position/speed control unit 111 performs Proportional Integral Differential (PID) control based on the position target value xtgt, the speed target value vtgt, the position present value xdet, and the speed present value vdet. Then, control instruction values drvin of the driven shaft 3, for matching the position of the driven shaft 3 to the position target value xtgt and for matching the speed of the driven shaft 3 to the speed target value vtgt, are generated, and the generated values are output to the drive instruction value generating unit 112. Here, the control instruction value drvin may be a voltage value or a current value. The control instruction value drvin may be data or signals indicating the torque, the position, the speed, and the like.

The drive instruction value generating unit 112 generates a first drive instruction value drvout1 and a second drive instruction value drvout2 based on the control instruction values drvin input from the position/speed control unit 111. The first drive instruction value drvout1 and the second drive instruction value drvout2 may be a voltage value or a current value in accordance with the control instruction value drvin. The first drive instruction value drvout1 and the second drive instruction value drvout2 may be data or signals indicating the torque, the position, the speed, and the like.

The drive instruction value generating unit 112 outputs the generated first drive instruction value drvout1 to the PWM generating unit 113 and outputs the generated second drive instruction value drvout2 to the PWM generating unit 114. A detailed method of generating, by the drive instruction value generating unit 112, the first drive instruction value drvout1 and the second drive instruction value drvout2 based on the control instruction values drvin, is described below with reference to FIG. 4.

The PWM generating unit 113 generates a PWM signal with a duty ratio in response to the first drive instruction value drvout1 for the first motor 1 input from the drive instruction value generating unit 112, and supplies the PWM signal to a driver 103.

The PWM generating unit 114 generates a PWM signal having a duty ratio in response to the second drive instruction value drvout2 for the second motor 2 input from the drive instruction value generating unit 112, and supplies the PWM signal to a driver 104.

The driver 103 operates according to the PWM signal supplied from the PWM generating unit 113 to apply a driving voltage to the U, V, and W phases of the first motor 1. Accordingly, the first motor 1 rotates. The driver 103 may be provided inside the first motor 1 or outside the first motor 1.

The driver 104 operates in accordance with the PWM signal supplied from the PWM generator 114 to apply a driving voltage to the U, V, and W phases of the second motor 2. Accordingly, the second motor 2 rotates. The driver 104 may be provided inside the second motor 2 or outside the second motor 2.

The encoder 105 is provided in the driven shaft 3 and outputs an encoding signal enc that is a pulse signal in response to the rotation of the driven shaft 3. The encoding signal enc is input to the position/speed control unit 111 of the control apparatus 110 and is used for Proportional-Integral-Differential (PID) control of the position and speed by the position/speed control unit 111.

<Method of Generating the First and Second Drive Instruction Values by the Drive Instruction Value Generating Unit 112 According to the First Embodiment>

Next, a method for generating the first and second drive instruction values by the drive instruction value generating unit 112 will be described with reference to FIG. 4.

Figure 4:
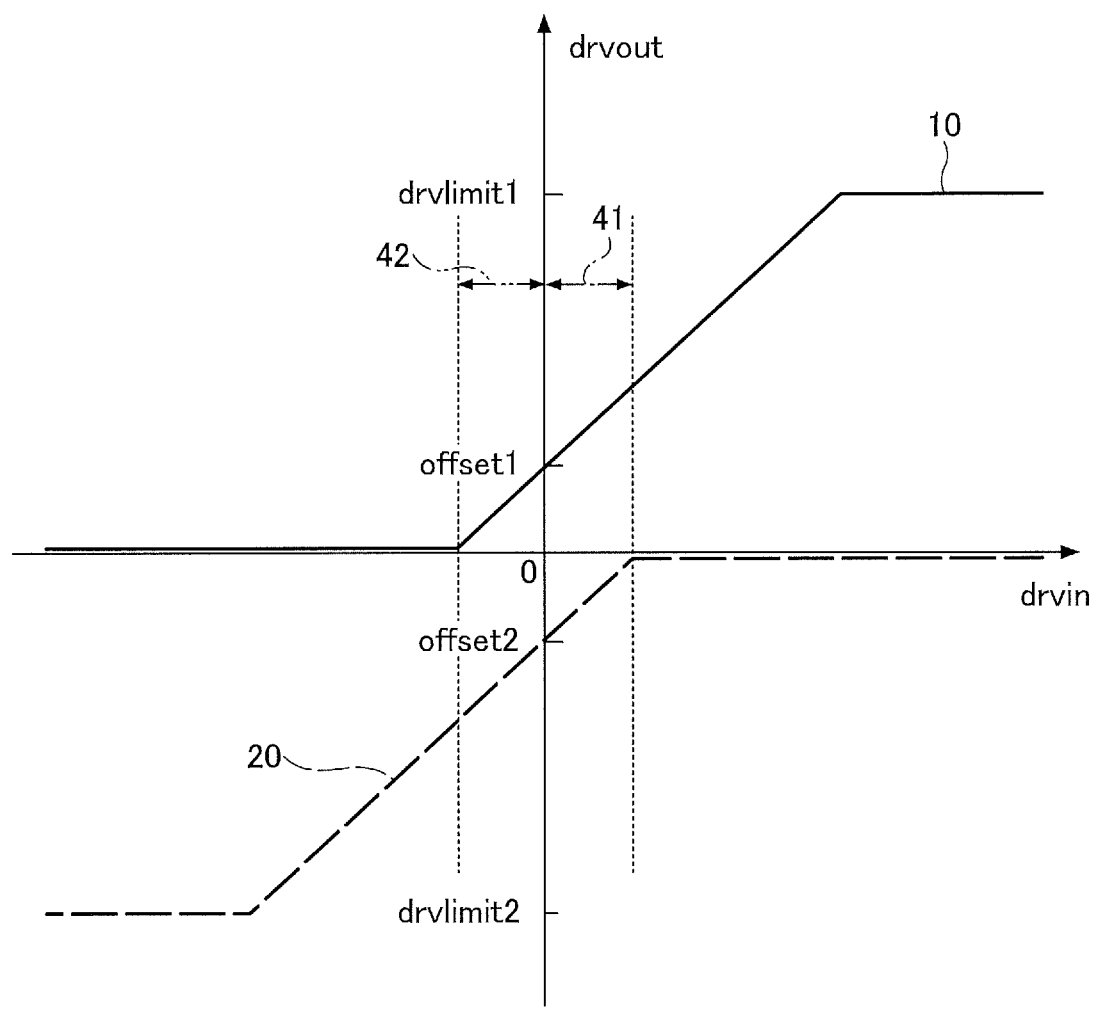
FIG. 4 is a diagram illustrating a generation example by a drive instruction value generating unit according to the first embodiment of the present invention.

FIG. 4 is a diagram illustrating an example of a method for generating the first and second drive instruction values by the drive instruction value generating unit 112. The horizontal axis of FIG. 4 represents the control instruction value drvin, and the vertical axis represents the drive instruction value drvout. A line 10 illustrated with a solid line represents a change, in response to the control instruction value drvin, of the first drive instruction value drvout1 for driving the first motor 1, and a line 20 illustrated with a dashed line represents a change, in response to the control instruction value drvin, of the second drive instruction value drvout2 for driving the second motor 2.

Referring to FIG. 4, a motor supplied with a positive drive instruction value drvout rotates in the CCW direction to apply torque in the CW direction to the driven shaft 3. Further, a motor supplied with a negative drive instruction value drvout rotates in the CW direction to apply torque in the CCW direction to the driven shaft 3.

As represented by the line 10, the first drive instruction value drvout1 increases in proportion to the control instruction value drvin, with a predetermined offset value offset1 being the intercept. When a limit instruction value drvlimit1 is reached, the limit instruction value drvlimit1 is fixed regardless of the control instruction value drvin. The first drive instruction value drvout1 decreases in proportion to the control instruction value drvin, and when the first drive instruction value drvout1 reaches 0, the first drive instruction value drvout1 becomes 0 regardless of the control instruction value drvin. Here, the limit instruction value drvlimit1 means the limit value that can be supplied to the first motor 1, which is a predetermined value according to the specification of the first motor 1. For example, when a voltage is output, a limit voltage value that can be applied to the first motor 1 corresponds to the limit instruction value drvlimit1. The limit instruction value drvlimit1 is an example of a "first threshold value".

As represented by the line 20, the second drive instruction value drvout2 decreases in proportion to the control instruction value drvin, with a predetermined offset value offset value offset2 being the intercept. When a limit instruction value drvlimit2 is reached, the limit instruction value drvlimit2 is fixed regardless of the control instruction value drvin. The second drive instruction value drvout2 increases in proportion to the control instruction value drvin, and when the second drive instruction value drvout2 reaches 0, the second drive instruction value drvout2 becomes 0 regardless of the control instruction value drvin. Here, the limit instruction value drvlimit2 means the limit value that can be supplied to the second motor 2, similar to the limit instruction value drvlimit1, and is a predetermined value according to the specification of the second motor 2. The limit instruction value drvlimit2 is an example of a "second threshold value".

The drive instruction value generating unit 112 outputs, to the PWM generating unit 113, the first drive instruction value drvout1 generated in accordance with the line 10, based on the input control instruction value drvin. The drive instruction value generating unit 112 outputs, to the PWM generating unit 113, the second drive instruction value drvout2 generated in accordance with the line 20, based on the input control instruction value drvin.

Here, when the driven shaft 3 is driven to rotate in the CW direction, in a range 41 of the control instruction value drvin illustrated by the dashed-dotted line arrow in FIG. 4, the first drive instruction value drvout1 increases in response to the control instruction value drvin, and the second drive instruction value drvout2 increases from the negative value to 0.

In the conventional technology, if the inertia of the driven shaft 3 is larger than the inertia of the first motor 1 and the second motor 2, when the control instruction value drvin exceeds the range 41, and the second drive instruction value drvout2 switches from a negative value to a positive value, that is, when the rotation of the second motor 2 switches from the CCW direction to the CW direction, the rotation of the gear 31 is delayed due to the inertia of the driven shaft 3, and the gear 31 may be separated from the gear 22 of the second motor 2.

On the other hand, in the present embodiment, as illustrated in FIG. 4, when the control instruction value drvin exceeds the range 41, the second drive instruction value drvout2 is set to less than or equal to 0, and the second motor 2 is not switched in the CW direction. This prevents the delay in the rotation of the gear 31 relative to the gear 22 and prevents the separation between the gear 22 and the gear 31.

When the driven shaft 3 is driven to rotate in the CCW direction, in a range 42 of the control instruction value drvin illustrated by a dashed-two dotted line arrow in FIG. 4, the second drive instruction value drvout2 decreases in response to the control instruction value drvin, and the first drive instruction value drvout1 decreases from a positive value towards 0.

In the conventional technology, in the same manner as described above, if the inertia of the driven shaft 3 is larger than the inertia of the first motor 1 and the second motor 2, when the control instruction value drvin exceeds the range 42, and the first drive instruction value drvout1 switches from a positive value to a negative value, that is, when the rotation of the first motor 1 switches from the CW direction to the CCW direction, the rotation of the gear 31 is delayed due to the inertia of the driven shaft 3, and the gear 31 may be separated from the gear 12 of the first motor 1.

On the other hand, in the present embodiment, as illustrated in FIG. 4, when the control instruction value drvin exceeds the range 42, the first drive instruction value drvout1 is set to greater than or equal to 0, and the first motor 1 is not switched in the CCW direction. This prevents the delay in rotation of the gear 31 relative to the gear 12 and prevents the separation between the gear 12 and the gear 31.

Here, each of the line 10 and the line 20 described above is an example of a conversion pattern used for the generation of the first drive instruction value drvout1 and the second drive instruction value drvout2 by the drive instruction value generating unit 112, but the present embodiment is not limited thereto. As long as the drive instruction value generating unit 112 can generate the first drive instruction value drvout1 that is greater than or equal to 0, and generate the second drive instruction value drvout2 that is less than or equal to 0, any conversion pattern may be used.

An example in which the first drive instruction value drvout1 increases in proportion to the control instruction value drvin within the range from 0 to the limit instruction value drvlimit1 is described above, but the present embodiment is not limited thereto. The first drive instruction value drvout1 may change in a nonlinear manner in response to the control instruction value drvin. Similarly, the second drive instruction value drvout2 may change in a nonlinear manner in response to the control instruction value drvin.

Figure 5:
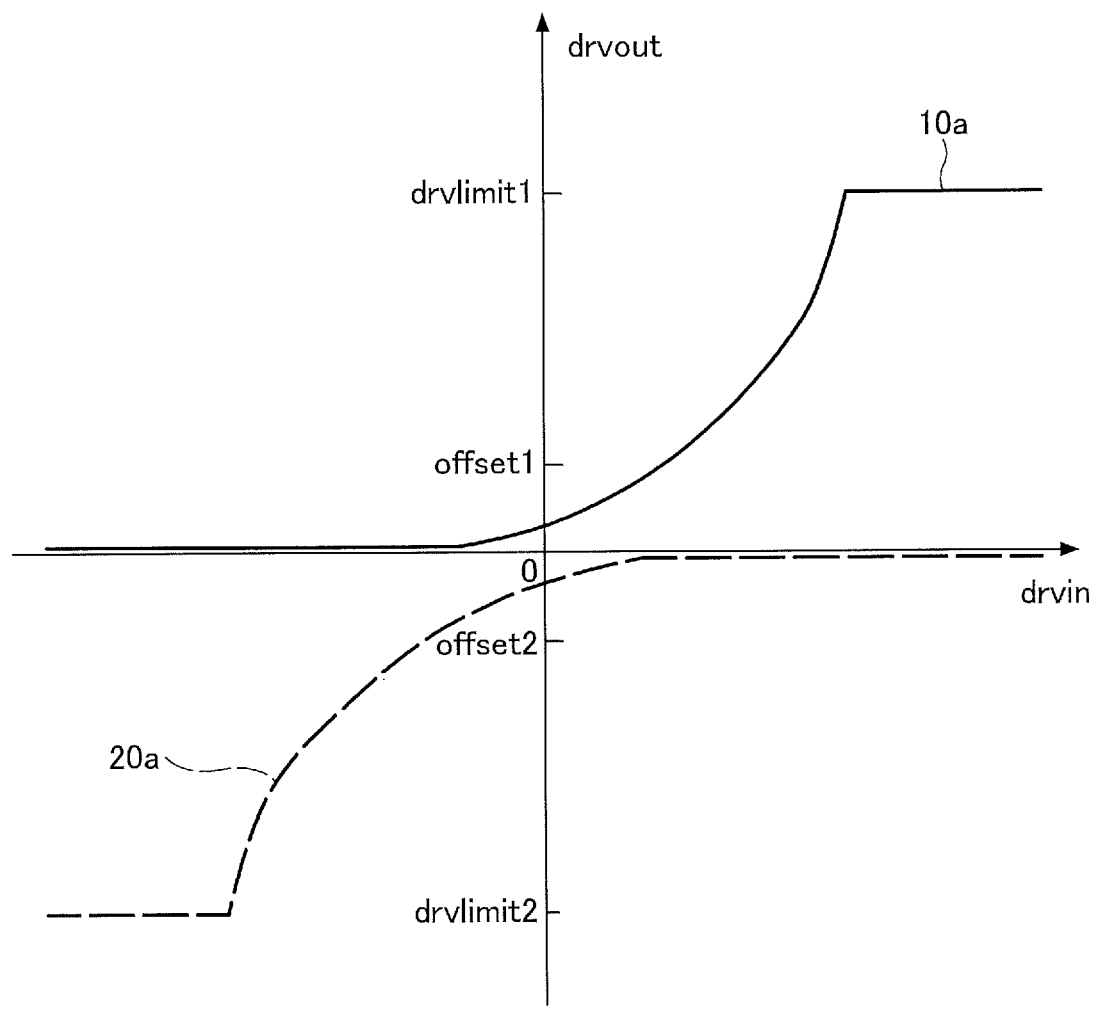
FIG. 5 is a diagram illustrating another example of generation by the drive instruction value generating unit according to the first embodiment of the present invention.

FIG. 5 is a diagram illustrating another example of the generation of the first and second drive instruction values by the drive instruction value generating unit 112. The method of viewing FIG. 5 is similar to that of FIG. 4.

In FIG. 5, a line 10a illustrated with a solid line represents a change of the first drive instruction value drvout1 in response to the control instruction value drvin, and a line 20a illustrated with a dashed line represents a change of the second drive instruction value drvout2 in response to the control instruction value drvin.

As illustrated by the line 10a, the first drive instruction value drvout1 changes nonlinearly in response to the control instruction value drvin within the range from 0 to the limit instruction value drvlimit1. As illustrated by the line 20a, the second drive instruction value drvout2 changes nonlinearly in response to the control instruction value drvin within the range from 0 to the limit instruction value drvlimit2. The drive instruction value generating unit 112 may use such a conversion pattern to generate the first drive instruction value drvout1 and the second drive instruction value drvout2.

<Start Condition and Termination Condition of Control by the Control Apparatus 110 According to the First Embodiment>

Next, the start condition and the termination condition of control by the control apparatus 110 will be described.

As an example, the control apparatus 110 starts the above-described control when the absolute value of the difference between a position target value xtgt input from an upper-level controller of the driving system 100 and a position present value xdet of the driven shaft 3 acquired based on the encoding signal enc of the driven shaft 3 by the encoder 105, is less than or equal to the minimum resolution for detection by the encoder 105.

In other words, when the absolute value of the difference between the position target value xtgt and the position present value xdet is less than or equal to a minimum angular resolution $\Delta p$ by the encoder 105, the drive instruction value generating unit 112 generates the first drive instruction value drvout1 that is greater than or equal to 0, generates the second drive instruction value drvout2 that is less than or equal to 0, and starts the above-described control.

For example, when the position target value xtgt and the position present value xdet are expressed as the number of pulses of the encoding signal enc, and the minimum angular resolution $\Delta p$ of the encoder 105 is 1 pulse, the control apparatus 110 starts the above-described control when the difference between the position target value xtgt and the position present value xdet is −1, 0, or 1.

Here, the position target value xtgt is an example of a "target output value" and the position present value xdet is an example of a "present output value". The encoder 105 is an example of an "angle detector", and the minimum angle resolution $\Delta p$ is an example of the "minimum resolution".

Figure 6:
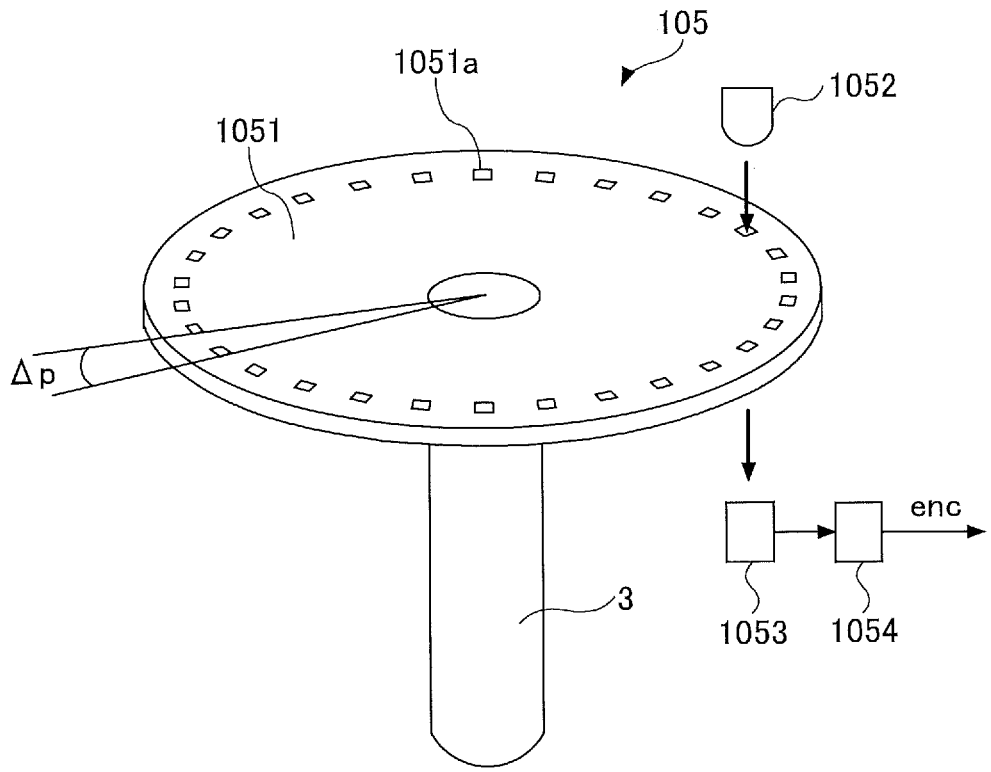
FIG. 6 is a diagram illustrating the minimum resolution of detection by an encoder according to the first embodiment of the present invention.

FIG. 6 is a diagram for describing an example of the minimum resolution of detection by the encoder 105. As illustrated in FIG. 6, the encoder 105 includes a rotating disk 1051, a light emitting element 1052, a light receiving element 1053, and an amplifier circuit 1054.

The rotating disk 1051 is a disk-like member mounted to the driven shaft 3, and rotates as the driven shaft 3 rotates. Fine through-holes 1051a penetrating the rotating disk 1051 are formed in a ring-like manner at predetermined angular intervals on the flat surface portion of the rotating disk 1051.

The light emitting element 1052 is formed of a Light Emitting Diode (LED) light source and the like, and radiates light toward the through hole 1051a of the rotating disk 1051.

The light receiving element 1053 is formed of a photo diode (PD) and the like and outputs a voltage signal in response to the intensity of the received light. The light receiving element 1053 is provided facing the light emitting element 1052 with the rotating disk 1051 sandwiched therebetween.

The amplifier circuit 1054 is an electrical circuit that amplifies the voltage signal from the light receiving element 1053 and outputs the voltage signal to the control apparatus 110.

The light emitting element 1052 radiates light onto the rotating disk 1051 that rotates as the driven shaft 3 rotates. When the through hole 1051a is positioned at the position of the radiation light, the radiation light passes through the through hole 1051a and is received by the light receiving element 1053. The light receiving element 1053 receives light for a period corresponding to the width of the through-hole 1051a in a circumferential direction of the rotating disk 1051 and outputs a pulse signal that is Hi during the aforementioned period at a cycle corresponding to a predetermined angular interval. The above-described pulse signal is amplified by the amplifier circuit 1054 and is output as an encoding signal enc to the control apparatus 110. The predetermined angular interval corresponds to the minimum angular resolution $\Delta p$ by the encoder 105.

The encoder 105 is not limited to the configuration illustrated in FIG. 6. As long as the rotation angle can be detected, the encoder 105 may have other configurations.

In the above-described example, when the absolute value of the difference between the position target value xtgt and the position present value xdet is less than or equal to the minimum angle resolution Δp by the encoder 105, the control is started, but the present embodiment is not limited thereto. The control apparatus 110 may start control when the absolute value of the difference between the speed target value vtgt and the speed present value vdet is less than or equal to the minimum resolution for detection by the encoder 105. However, in this case, the minimum resolution for detection by the encoder 105 corresponds to a derivative value of the minimum angle resolution Δp.

As another example, the control apparatus 110 may start the above-described control when the rotational speed of the driven shaft 3 is less than or equal to a predetermined speed threshold.

Figure 7:
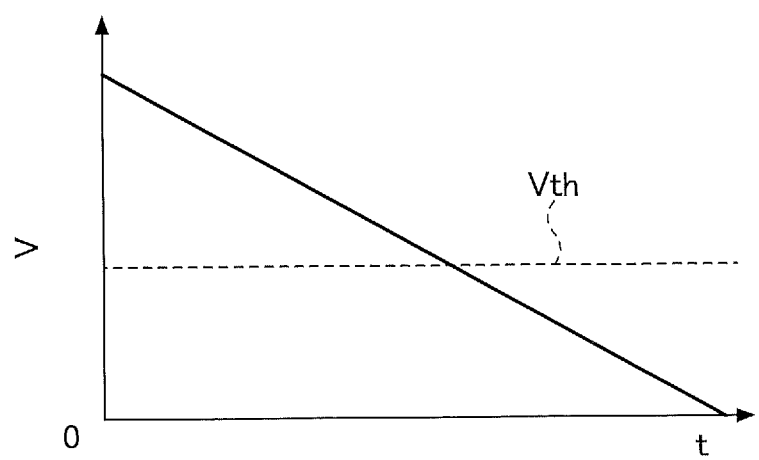
FIG. 7 is a diagram illustrating an example of a speed threshold value of a rotational speed of a driven shaft according to the first embodiment of the present invention.

FIG. 7 is a diagram illustrating an example of a speed threshold value of the rotational speed of the driven shaft 3. The horizontal axis of FIG. 7 represents the time t and the vertical axis of FIG. 7 represents the rotational speed V. When the rotational speed of the driven shaft 3 gradually decreases and reaches a speed threshold value Vth illustrated with a dashed line in FIG. 7, the control apparatus 110 starts the above-described control.

On the other hand, the control apparatus 110 can terminate the above-described control when the position target value xtgt becomes equal to the position present value xdet or when the speed target value vtgt becomes equal to the speed present value vdet, by executing the above-described control.

<Control Operation by the Control Apparatus 110 According to the First Embodiment>

Figure 8:
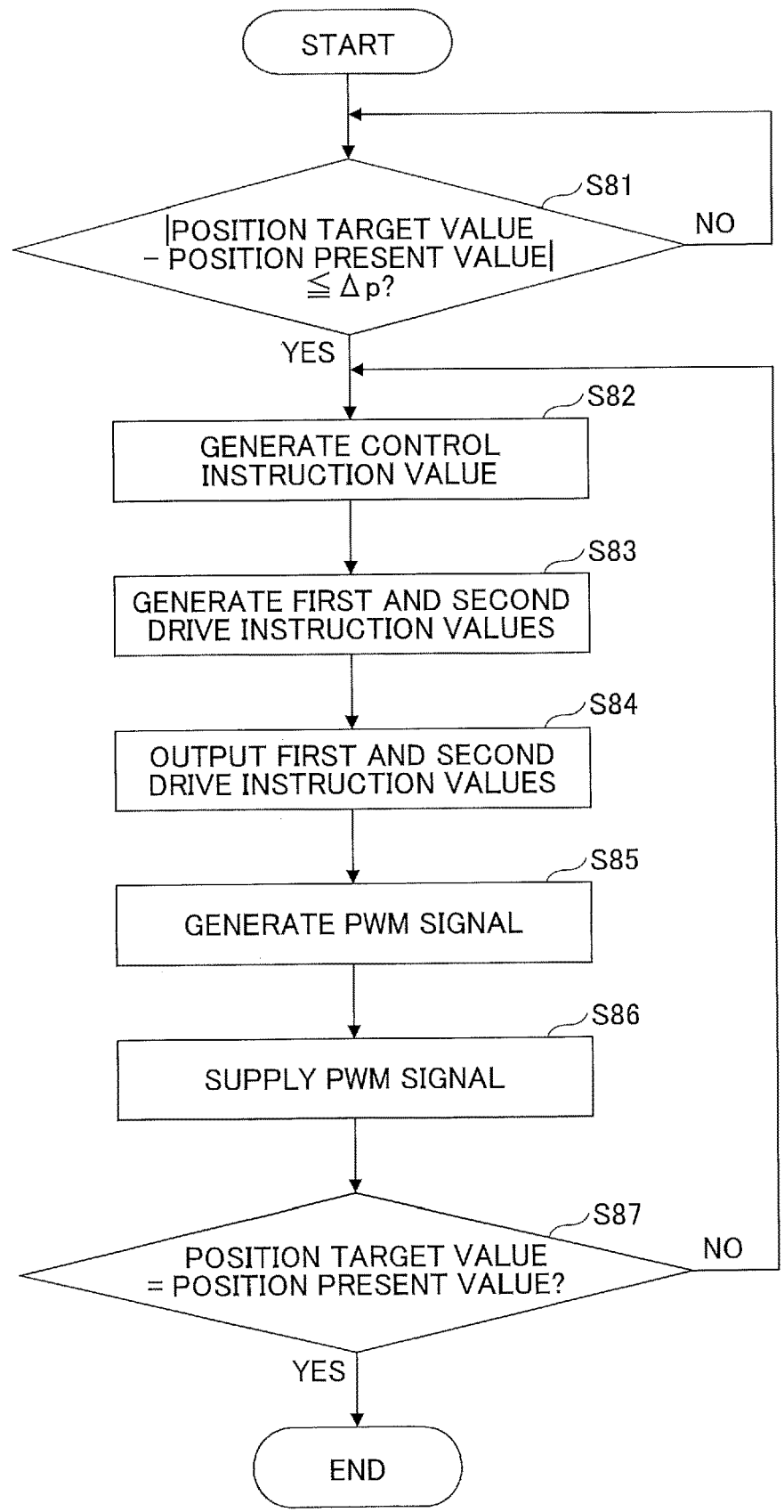
FIG. 8 is a flowchart illustrating a control operation example of the control apparatus according to the first embodiment of the present invention.

Next, the control operation by the control apparatus 110 will be described with reference to FIG. 8. FIG. 8 is a flowchart illustrating an example of a control operation by the control apparatus 110. Hereinafter, control is performed using the position target value xtgt and the position present value xdet.

First, in step S81, the position/speed control unit 111 determines whether the absolute value of the difference between the position target value xtgt and the position present value xdet is less than or equal to the minimum angle resolution Δp.

In step S81, when it is determined that the absolute value of the difference is not less than or equal to the minimum angle resolution Δp (No in step S81), the process of step S81 is performed again.

On the other hand, when it is determined in step S81 that the absolute value of the difference is less than or equal to the minimum angle resolution Δp (Yes in step S81), in step S82, the position/speed control unit 111 performs PID control based on the position target value xtgt and the position present value xdet. The control instruction value drvin for the driven shaft 3, for matching the position of the driven shaft 3 to the position target value xtgt, is generated, and the control instruction value drvin is output to the drive instruction value generating unit 112.

Subsequently, in step S83, the drive instruction value generating unit 112 generates the first drive instruction value drvout1 and the second drive instruction value drvout2 based on the control instruction value drvin input from the position/speed control unit 111. The generation of the first drive instruction value drvout1 and the second drive instruction value drvout2 may be sequentially performed in random order, or both may be performed in parallel.

Subsequently, in step S84, the drive instruction value generating unit 112 outputs the first drive instruction value drvout1 to the PWM generating unit 113 and outputs the second drive instruction value drvout2 to the PWM generating unit 114. The output to each of the PWM generating unit 113 and the PWM generating unit 114 may be sequentially performed in in random order, or both may be performed in parallel.

Subsequently, in step S85, the PWM generating unit 113 generates a PWM signal having a duty ratio in response to the first drive instruction value drvout1, and the PWM generating unit 114 generates a PWM signal having a duty ratio in response to the second drive instruction value drvout2.

Subsequently, in step S86, the PWM generating unit 113 supplies the generated PWM signal to the first motor 1 via the driver 103. The PWM generating unit 114 supplies the generated PWM signal to the second motor 2 via the driver 104. Therefore, the driven shaft 3 is driven to rotate.

Subsequently, in step S87, the position/speed control unit 111 determines whether the position target value xtgt is equal to the position present value xdet.

In step S87, when it is determined that the position target value xtgt is equal to the position present value xdet (Yes in step S87), the control apparatus 110 terminates the process. On the other hand, when it is determined that the position target value xtgt is not equal to the position present value xdet (No in step S87), the process returns to step S82 and the process from step S82 is performed again.

In this manner, the control apparatus 110 can control the rotational driving of the driven shaft 3 by using the first motor 1 and the second motor 2.

<Effects of Functions of the Control Apparatus 110 According to the First Embodiment>

Conventionally, there are known techniques for preventing backlash between two motors and a driven shaft when two motors drive one driven shaft.

Further, in a case of driving a driven body with first and second motors, an apparatus for driving the first and second motors on the basis of a torque instruction value for each of the first and second motors and a pre-load torque value generated in response to a change in the acceleration is disclosed in, for example, Patent Document 1 (see the section of "2. Description of the Related Art" herein).

However, when the inertia of the driven shaft 3 is larger than the inertia of the first motor 1 and the second motor 2, the rotation of the gear 31 is delayed in terms of time with respect to the rotation of the first motor 1 or the second motor 2 due to the inertia of the driven shaft 3, and the teeth of the gear 12 and the teeth of the gear 31 may be separated, or the teeth of the gear 22 and the teeth of the gear 31 may be separated. Due to the teeth separation, the second motor 2 cannot provide, to the driven shaft 3, the torque in a direction opposite to that of the torque provided by the first motor 1, and, therefore, backlash cannot be prevented.

In particular, if the amount of rotation of the driven shaft 3 is small, the rotation ends without obtaining the effect of preventing backlash in the state where the teeth of the gears are separated, and, therefore, the impact of the backlash is large.

With regard to the apparatus disclosed in Patent Document 1, there is no disclosure of cases where the inertia of the driven shaft 3 is larger than the inertia of the first motor 1 and the second motor 2, and/or the amount of rotation of the driven shaft 3 is small, and, therefore, there are cases where the above-described backlash cannot be appropriately prevented.

In the present embodiment, in order to drive the first motor 1 which provides the torque in the CW direction to the driven shaft 3, the first drive instruction value drvout1 that is greater than or equal to 0 is generated, and in addition, in order to drive the second motor 2 which provides the torque in the CCW direction to the driven shaft 3, the second drive instruction value drvout2 that is less than or equal to 0 is generated. When the first motor 1 is driven by the first drive instruction value drvout1 and the second motor 2 is driven by the second drive instruction value drvout2, the function described above with reference to FIG. 4 can prevent the separation between the teeth of the gear 12 and the teeth of the gear 31 or between the teeth of the gear 22 and the teeth of the gear 31, and backlash can be prevented.

According to the present embodiment, when the absolute value of the difference between the position present value xdet and the position target value xtgt is less than or equal to the minimum angular resolution Δp by the encoder 105, generation of the first drive instruction value drvout1 and the second drive instruction value drvout2 by the drive instruction value generating unit 112 is started. Accordingly, it is possible to prevent the separation of the teeth of the gears and prevent the backlash, in a situation where the amount of rotation of the driven shaft 3 is small such that teeth separation between the gear 12 and the gear 31 or between the gear 22 and the gear 31 is likely to occur.

In the present embodiment, when the rotational speed of the driven shaft 3 is less than or equal to the speed threshold Vth, the generation of the first drive instruction value drvout1 and the second drive instruction value drvout2 by the drive instruction value generating unit 112 is started. Thus, in the same manner as described above, it is possible to prevent the separation of the teeth of the gears and prevent the backlash, in a situation where the amount of rotation of the driven shaft 3 is small such that teeth separation between the gear 12 and the gear 31 or between the gear 22 and the gear 31 is likely to occur.

According to the present embodiment, when the position present value of the encoder 105 is equal to the position target value, the generation of the first drive instruction value drvout1 and the second drive instruction value drvout2 by the drive instruction value generating unit 112 is terminated. Accordingly, control by the control apparatus 110 can be terminated at an appropriate time.

In the present embodiment, the first drive instruction value drvout1, which increases or decreases in response to the control instruction value drvin, is generated within a range in which the first drive instruction value drvout1 is changed from 0 to the limit instruction value drvlimit1. Further, the second drive instruction value drvout2, which increases or decreases in response to the control instruction value, is generated within a range in which the second drive instruction value drvout2 changes from 0 to the limit instruction value drvlimit2. Accordingly, even in a case of the control instruction value drvin by which teeth separation between the gear 12 and the gear 31 or between the gear 22 and the gear 31 is likely to occur, the teeth separation can be prevented and backlash can be prevented.

In the present embodiment, within the range in which the first drive instruction value drvout1 changes from 0 to the limit instruction value drvlimit1, the first drive instruction value drvout1 proportional to the control instruction value drvin is generated. Further, within the range in which the second drive instruction value drvout2 changes from 0 to the limit instruction value drvlimit2, the second drive instruction value drvout2 proportional to the control instruction value drvin is generated. Accordingly, in the range of the control instruction value drvin by which the teeth separation between the gear 12 and the gear 31 or between the gear 22 and the gear 31 is unlikely to occur, the first drive instruction value drvout1 and the second drive instruction value drvout2 proportional to the control instruction value drvin can be generated, and the driven shaft 3 can be controlled according to the control instruction value drvin.

(Modified Example of the First Embodiment)

Figure 9:
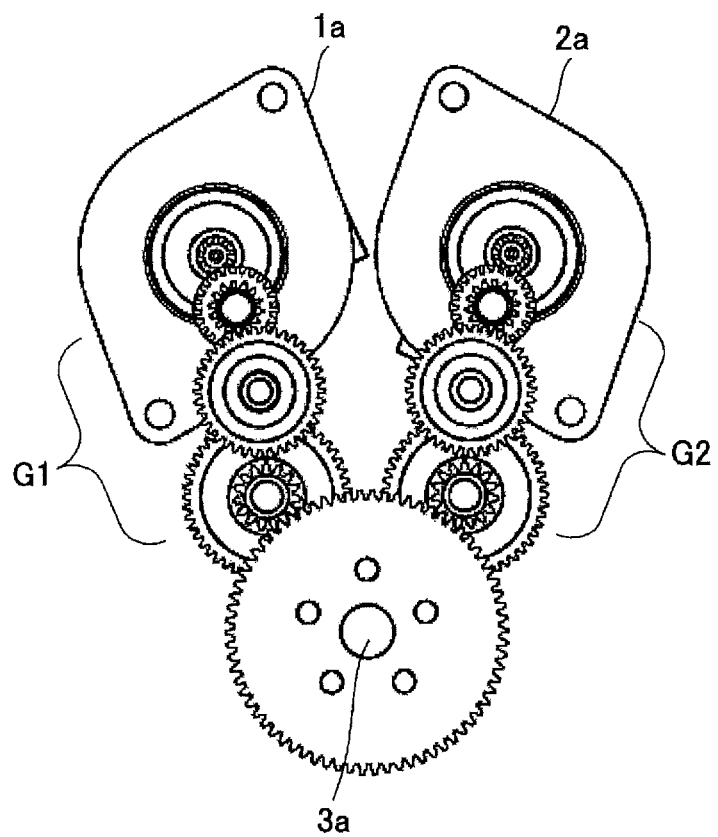
FIG. 9 is a diagram illustrating a configuration example of a first motor and a second motor and a driven shaft according to a modified example of the first embodiment of the present invention.

FIG. 9 is a diagram illustrating an example of a configuration in which a multi-stage gear is interposed between the first motor 1 and the driven shaft 3 and between the second motor 2 and the driven shaft 3, as a modified example of the first embodiment.

In FIG. 9, a multi-stage gear G1 is provided between a first motor 1a and a driven shaft 3a, and torque of the first motor 1a is transmitted to the driven shaft 3a via the multi-stage gear G1. A multi-stage gear G2 is provided between a second motor 2a and the driven shaft 3a, and the torque of the second motor 2a is transmitted to the driven shaft 3a via the multi-stage gear G2. Even in such an arrangement, the embodiment described above may be applied.

Second Embodiment

Figure 10:
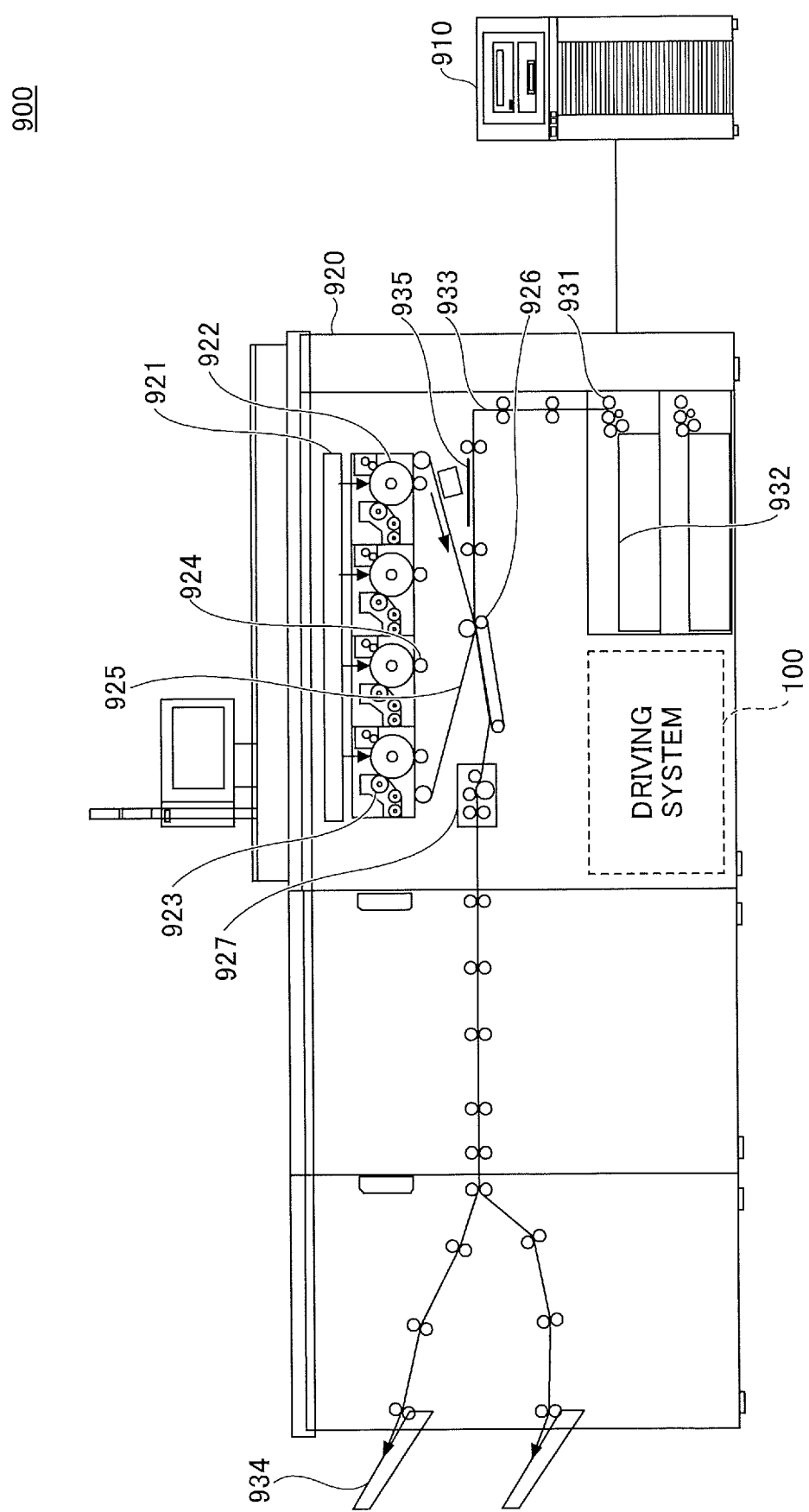
FIG. 10 is a diagram illustrating a configuration example of an image forming apparatus according to a second embodiment of the present invention.

Next, a second embodiment will be described. FIG. 10 is a diagram illustrating an example of the configuration of an image forming apparatus 900 according to the second embodiment. The image forming apparatus 900 includes a print server 910 and a main body 920. The print server 910 stores print data. The print data stored in the print server 910 is transmitted to the main body 920 according to an instruction given by the user.

The main body 920 includes an optical device 921, a photoconductive drum 922, a developing roller 923, a conveying roller 924, a transfer belt 925, a conveying roller 926, a fixing device 927, a conveying apparatus 931, a paper sheet tray 932, a conveyance path 933, a sheet discharge tray 934, and a recording sheet 935.

The main body 920 performs processes such as color correction, density conversion, and value reduction on the print data. The main body 920 then transmits the final binary print data to the optical device 921.

The optical device 921 uses a laser diode and the like as a laser light source. The optical device 921 radiates laser light in response to print data, to the photoconductive drum 922 that is in a uniformly charged state.

The surface of the photoconductive drum 922, that is in a uniformly charged state, is irradiated with laser light in response to print data, so that electric charges are lost only at the portion irradiated with the laser light. Accordingly, a latent image in response to print data is formed on the surface of the photoconductive drum 922. The formed latent image moves in the direction of the corresponding developing roller 923 as the photoconductive drum 922 rotates.

The developing roller 923 rotates while causing the toner supplied from a toner cartridge to adhere to the surface of the developing roller 923. The developing roller 923 causes the toner adhered to the surface of the developing roller 923 to adhere to the latent image formed on the surface of the photoconductive drum 922. Accordingly, the developing roller 923 develops the latent image formed on the surface of the photoconductive drum 922 and forms a toner image on the surface of the photoconductive drum 922.

The toner image formed on the surface of the photoconductive drum 922 is transferred to the transfer belt 925 between the photoconductive drum 922 and the conveying roller 924. Thus, a toner image is formed on the transfer belt 925.

In the example illustrated in FIG. 10, the optical device 921, the photoconductive drum 922, the developing roller 923, and the conveying roller 924 are provided for each of the four print colors (Y, C, M, and K). Accordingly, a toner image of each print color is formed on the transfer belt 925.

The conveying apparatus 931 delivers the recording sheet 935 from the paper sheet tray 932 to the conveyance path 933. The recording sheet 935 fed to the conveyance path 933 is conveyed between the transfer belt 925 and the conveying roller 926. Accordingly, the toner image of each print color formed on the transfer belt 925 is transferred to the recording sheet 935 between the transfer belt 925 and the conveying roller 926. Thereafter, the toner image is fixed to the recording sheet 935 by heat and pressure applied by the fixing device 927. Then, the recording sheet 935 is conveyed to the sheet discharge tray 934.

For example, in the image forming apparatus 900 configured as above, the driving system 100 according to the first embodiment is applied so that the driving shaft of various rollers (for example, a sheet feed roller, a conveying roller, a secondary conveying roller, a fixing roller, and the like) is driven by the first motor 1 and the second motor 2. As described in the first embodiment, the first drive instruction value drvout1 of the first motor 1 and the drive instruction value drvout2 of the second motor 2 are controlled by the control apparatus 110 (see FIG. 3). Therefore, in the image forming apparatus 900, various rollers can be driven by using the first motor 1 and the second motor 2. In this case, backlash between each of the first motor 1 and the second motor 2, and the driving shaft of the various rollers, can be prevented.

Third Embodiment

Figure 11:
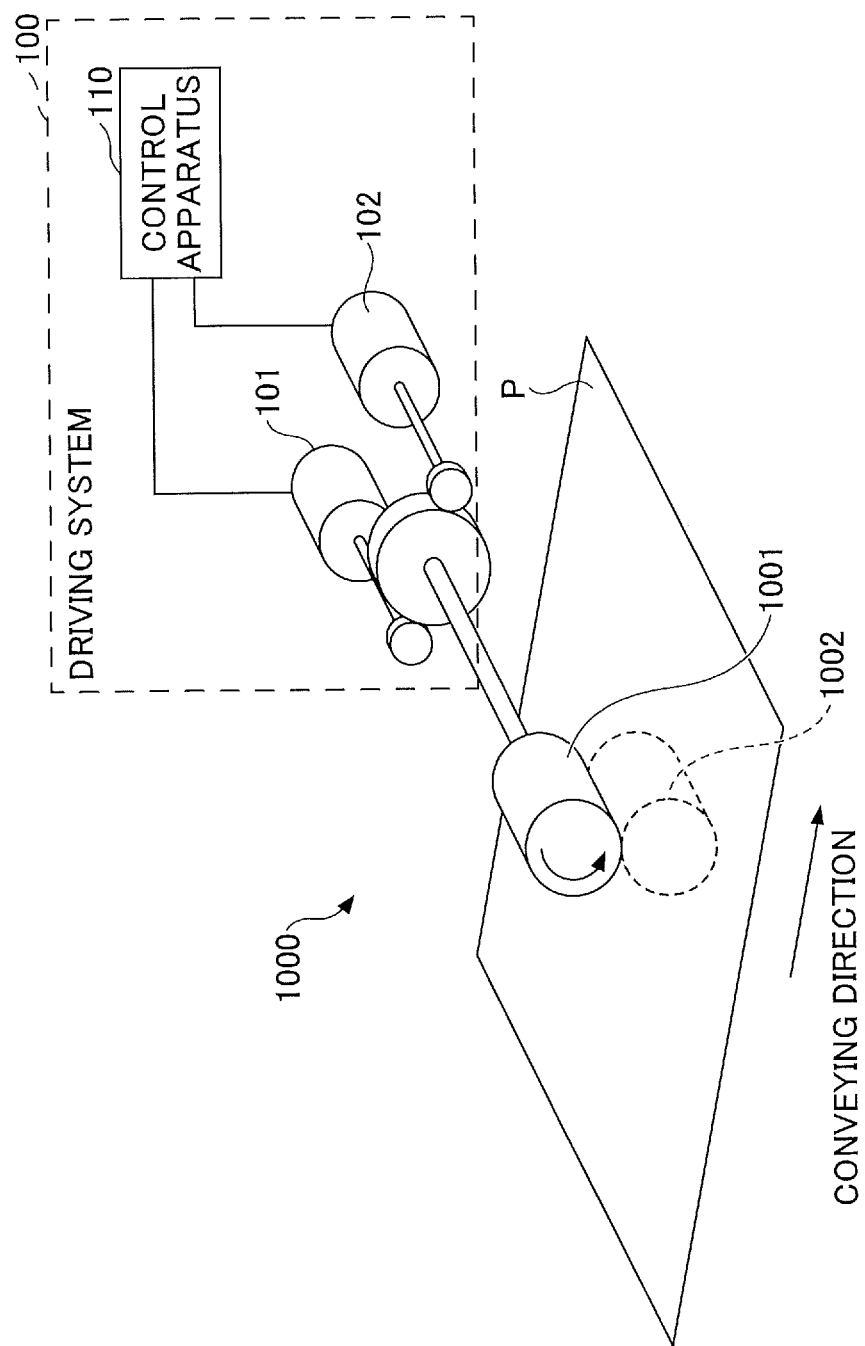
FIG. 11 is a diagram illustrating a configuration example of a conveying apparatus according to a third embodiment of the present invention.

FIG. 11 is a diagram illustrating an example of the configuration of a conveying apparatus 1000 according to the third embodiment. The conveying apparatus 1000 illustrated in FIG. 11 is an apparatus for conveying paper P. As illustrated in FIG. 11, the conveying apparatus 1000 includes a conveying roller 1001 and a conveying roller 1002. The conveying roller 1001 conveys the paper P in a predetermined conveying direction by rotating with the paper P sandwiched between the conveying roller 1001 and the conveying roller 1002.

For example, in the conveying apparatus 1000 configured as described above, as illustrated in FIG. 11, the driving system 100 according to the first embodiment is applied so that the driving shaft of the conveying roller 1001 is driven by the first motor 1 and the second motor 2. As described in the first embodiment, the first drive instruction value drvout1 of the first motor 1 and the drive instruction value drvout2 of the second motor 2 are controlled by the control apparatus 110 (see FIG. 3). Accordingly, the conveying roller 1001 can be driven in the conveying apparatus 1000 using the first motor 1 and the second motor 2. In this case, backlash between each of the first motor 1 and the second motor 2, and the driving shaft of the conveying roller 1001, can be prevented.

[Anther Preferred Embodiment]

Figure 12:
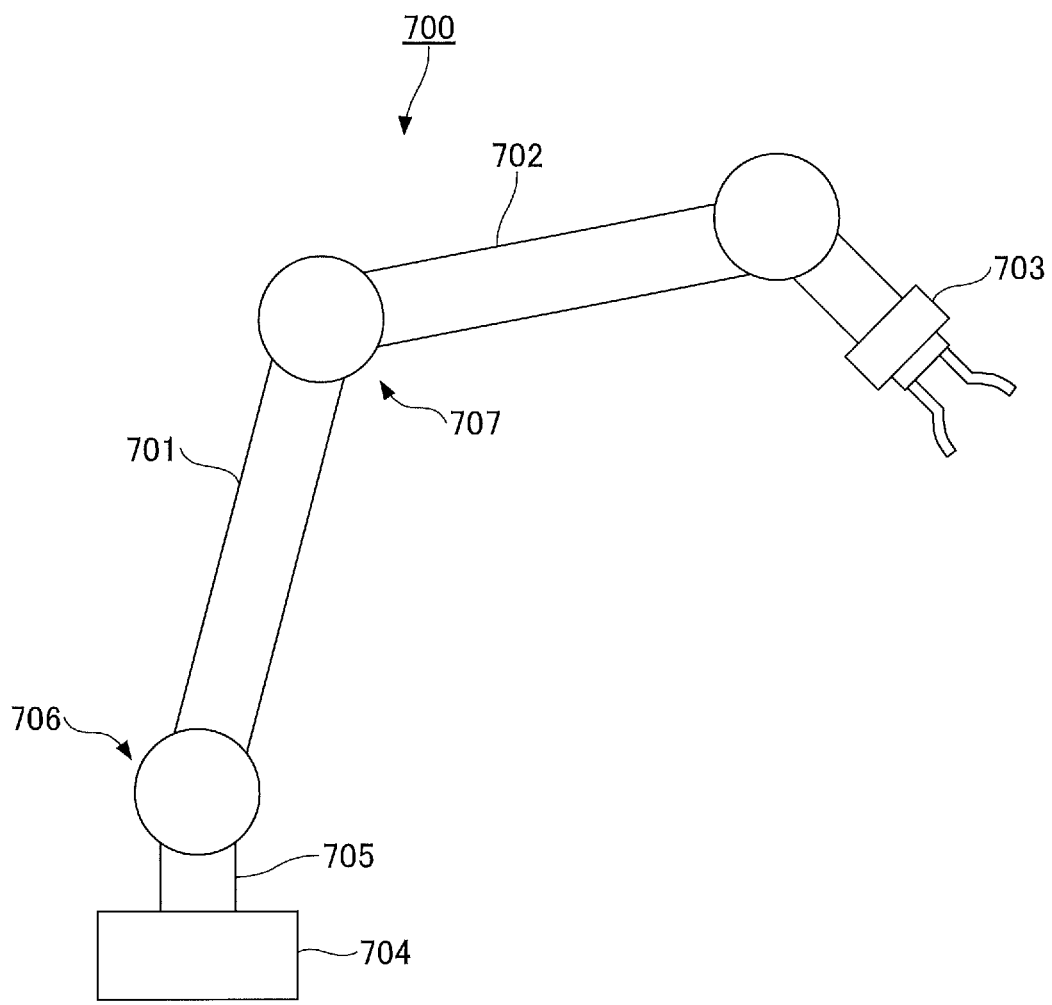
FIG. 12 is a diagram illustrating a configuration of a manipulator apparatus according to another embodiment of the present invention.

FIG. 12 is a diagram illustrating an example of a configuration of a manipulator apparatus 700 according to another embodiment. The manipulator apparatus 700 is a two-degree-of-freedom manipulator apparatus with two joints, and is used by being mounted on a rotating stage, etc.

As illustrated in FIG. 12, the manipulator apparatus 700 includes a first arm 701 and a second arm 702 with a picking hand 703 as an end effector at the leading end of the second arm 702.

The base end of the first arm 701 is rotatably mounted to the upper end of a support body 705 that is fixed to the upper portion of a pedestal 704. The portion where the first arm 701 and the support body 705 are attached to each other corresponds to a first joint 706. The base end of the second arm 702 is rotatably mounted to the leading end of the first arm 701, and the portion where the second arm 702 and the first arm 701 are attached to each other corresponds to a second joint 707.

In the manipulator apparatus 700 configured in this manner, the driving system 100 of the first embodiment is applied to drive a driving shaft of at least one of the picking hand 703, the first arm 701, and the second arm 702, by the first motor 1 and the second motor 2.

As described in the first embodiment, the first drive instruction value drvout1 of the first motor 1 and the drive instruction value drvout2 of the second motor 2 are controlled by the control apparatus 110 (see FIG. 3). Accordingly, the picking hand 703, the first arm 701, or the second arm 702 can be driven in the manipulator apparatus 700 using the first motor 1 and the second motor 2. In this case, backlash between each of the first motor 1 and the second motor 2, and the driving shaft of the picking hand 703, the first arm 701, or the second arm 702 can be prevented.

Note that not only the manipulator apparatus illustrated in FIG. 12, but a robot having various applications including a robot arm, such as an industrial robot or a home robot, may be subject to the application of the driving system 100 according to the first embodiment.

While the preferred embodiments and examples of the present invention have been described in detail above, the present invention is not limited to these embodiments and examples, and various modifications or variations may be made within the scope of the present invention as defined in the appended claims.

For example, in the above-described example, the control apparatus 110 is applied to the image forming apparatus, the conveying apparatus, and the manipulator apparatus. However, the embodiment can be applied to any apparatus provided that the configuration in which the same driving shaft is driven by the first motor 1 and the second motor 2 is employed.

As an example, an embodiment can be applied to a configuration for driving a conveying roller in a conveying apparatus for conveying a sheet-like prepreg, a bill, and the like. Further, the embodiment can be applied to a configuration for obtaining power by rotational movement of a driving shaft driven by the first motor 1 and the second motor 2 in an automobile, a robot, an amusement device, and the like.

Embodiments also include control methods. For example, a control method includes generating a first drive instruction value that is greater than or equal to 0 for driving a first motor that provides a torque in a first rotation direction to a driven shaft, and a second drive instruction value that is less than or equal to 0 for driving a second motor that provides a torque in a second rotation direction opposite to the first rotation direction to the driven shaft. By such a control method, the same effect as the above-described control apparatus can be obtained.

Further, the functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC) a digital signal processor (DSP), a field programmable gate array (FPGA), and a conventional circuit module, designed to execute each function as described above.

According to one embodiment of the present invention, it is possible to appropriately prevent the backlash between the motor and the driven shaft.

The control apparatus and the control method are not limited to the specific embodiments described in the detailed description, and variations and modifications may be made without departing from the spirit and scope of the present invention.

What is claimed is:

1. A control apparatus comprising:
a drive instruction value generator configured to generate
a first drive instruction value that is greater than or equal to 0, which corresponds to torque in a first rotation direction, for driving a first motor that applies the torque in the first rotation direction to a shaft, and
a second drive instruction value that is less than or equal to 0, which corresponds to torque in a second rotation direction, for driving a second motor, which is different from the first motor, that applies the torque in the second rotation direction, which is an opposite direction to the first rotation direction, to the shaft.

2. The control apparatus according to claim 1, wherein the drive instruction value generator generates the first drive instruction value and the second drive instruction value upon determining that an absolute value of a difference between a present output value of an angle detector configured to detect a rotation angle of the shaft and a target output value of the angle detector is less than or equal to a minimum resolution of detection by the angle detector.

3. The control apparatus according to claim 1, wherein the drive instruction value generator generates the first drive instruction value and the second drive instruction value upon determining that a rotational speed of the shaft is less than or equal to a predetermined speed threshold value.

4. The control apparatus according to claim 1, wherein the drive instruction value generator terminates generating the first drive instruction value and the second drive instruction value upon determining that a present output value of an angle detector configured to detect a rotation angle of the shaft and a target output value of the angle detector are equal to each other.

5. The control apparatus according to claim 1, wherein the drive instruction value generator
generates the first drive instruction value that increases or decreases in response to a control instruction value that is input, within a range in which the first drive instruction value changes from 0 to a predetermined first threshold value, and
generates the second drive instruction value that increases or decreases in response to the control instruction value, within a range in which the second drive instruction value changes from 0 to a predetermined second threshold value.

6. The control apparatus according to claim 1, wherein the drive instruction value generator
generates the first drive instruction value that is proportional to a control instruction value that is input, within a range in which the first drive instruction value changes from 0 to a predetermined first threshold value, and
generates the second drive instruction value that is proportional to the control instruction value, within a range in which the second drive instruction value changes from 0 to a predetermined second threshold value.

7. An image forming apparatus comprising the control apparatus according to claim 1.

8. A conveying apparatus comprising the control apparatus according to claim 1.

9. A control method comprising:
generating a first drive instruction value that is greater than or equal to 0, which corresponds to torque in a first rotation direction, for driving a first motor that applies the torque in the first rotation direction to a shaft, and
generating a second drive instruction value that is less than or equal to 0, which corresponds to torque in a second rotation direction, for driving a second motor, which is different from the first motor, that applies the torque in the second rotation direction, which is an opposite direction to the first rotation direction, to the shaft.

* * * * *